No. 765,831. Patented July 26, 1904.

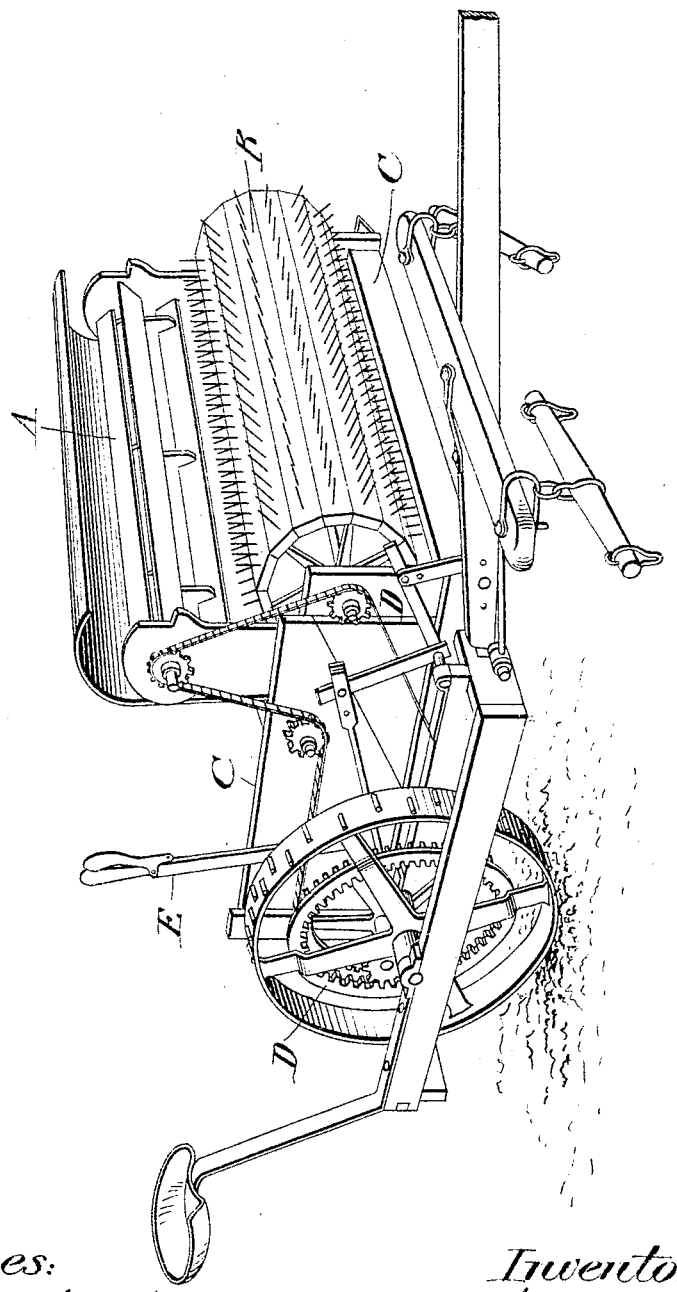

UNITED STATES PATENT OFFICE.

JAMES HALL, OF JACKSONVILLE, ILLINOIS.

SEED-GATHERER.

SPECIFICATION forming part of Letters Patent No. 765,831, dated July 26, 1904.

Application filed January 6, 1904. Serial No. 187,992. (No model.)

*To all whom it may concern:*

Be it known that I, JAMES HALL, a citizen of the United States, residing at Jacksonville, in the county of Morgan and State of Illinois, have invented an Improvement in Grass-Seed Gatherers, of which the following is a specification, reference being had to the accompanying drawing.

My invention relates to that class of grass-seed gatherers by which a circular rotary drum with teeth on the outer surface is rapidly revolved while the machine is moving over the grass, the teeth of the cylinder striking and driving the seed under the cylinder into the seedbox, this circular rotary drum and seedbox, with the ordinary gearing of cog, shaft, sprocket, and chain from the main wheel, being supported on a frame eight feet in length by four feet in width, drawn by horses, as shown in the accompanying drawing.

The object of my invention is to prevent the seed from being carried past the seedbox and lost by the strong circular current of air generated by the rapid revolution of the circular rotary drum. I accomplish this by placing above, behind, and as near as possible to the circular rotary drum and parallel to it the rotary fan A, with four blades of equal length with the rotary drum B, and which is operated with the same cog, shaft, sprocket, and chain gearing and in the same direction as the rotary drum B at a point where a counter-current of air is generated, arresting the seed and causing them to drop into the seedbox.

In the drawing, A is the rotary fan with cover lifted, showing three of the four blades, which are three inches wide and one-fourth inch thick, made either of metal or wood, the fan being eight inches in diameter.

B represents the rotary drum, fifteen inches in diameter and six feet in length, with metal teeth.

C C represent the right side and front end of the seedbox, having side and rear board walls twenty (20) inches in height and when in action a canvas cover.

D D represent the cog, shaft, sprocket, and chain gearing to the main wheel, by which the rotary drum and fan are operated.

E represents the lever, with spring, catch, and ratchet, by which the driver from his seat raises and lowers the front of the machine.

I am aware that prior to my invention grass-seed gatherers have been made with revolving rotary drum with teeth substantially as shown in the accompanying drawing.

Having fully described my invention, what I claim as new, and desire to secure by Letters Patent, is—

In a seed-gatherer, a frame, supporting-wheels therefor, a box on the frame, a rotatable drum mounted in the sides of the box at its forward end, teeth projecting from the periphery of the drum, a rotary fan supported by the box, slightly above and behind the drum, a suitable casing for the fan, and a flexible connection between the supporting-wheels, drum and fan, whereby the drum and fan are caused to rotate in the same direction, and means under the control of an operator for raising and lowering the forward end of the frame.

JAMES HALL.

Witnesses:
ERNEST F. JOHNSTON,
MARY CLARK.